US012118890B2

United States Patent
Nykl et al.

(10) Patent No.: US 12,118,890 B2
(45) Date of Patent: Oct. 15, 2024

(54) STEREO VISION RELATIVE NAVIGATION OF AIRBORNE VEHICLES

(71) Applicant: US Govt as represented by Secretary of Air Force, Wright-Patterson AFB, OH (US)

(72) Inventors: Scott Nykl, Fairborn, OH (US); Brian Woolley, Dayton, OH (US); John Pecarina, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 358 days.

(21) Appl. No.: 16/985,502

(22) Filed: Aug. 5, 2020

(65) Prior Publication Data
US 2021/0104162 A1  Apr. 8, 2021

Related U.S. Application Data

(60) Provisional application No. 62/886,550, filed on Aug. 14, 2019.

(51) Int. Cl.
*G08G 5/00* (2006.01)
*B64U 50/34* (2023.01)
(Continued)

(52) U.S. Cl.
CPC ........... *G08G 5/0008* (2013.01); *B64U 50/34* (2023.01); *G01S 17/933* (2013.01); *G06N 20/00* (2019.01);
(Continued)

(58) Field of Classification Search
CPC .... G08G 5/0008; G08G 5/003; G01S 17/933; G06N 20/00; G06T 3/4084; G06T 7/285;
(Continued)

(56) References Cited

U.S. PATENT DOCUMENTS

2011/0147528 A1* 6/2011 Adarve Lozano ... H04N 13/139
244/135 A
2018/0350104 A1* 12/2018 Lozano .................. B64D 39/00
(Continued)

FOREIGN PATENT DOCUMENTS

KR       20150144124 A  * 12/2015 ............. G01C 11/28

OTHER PUBLICATIONS

Marco Mammarella, Giampiero Campa, Marcello R. Napolitano, Mario L. Fravolini, "Comparison of point matching algorithms for the UAV aerial refueling problem", Jun. 12, 2008 (Year: 2008).*
(Continued)

*Primary Examiner* — Ig T An
*Assistant Examiner* — Christine Nguyen Huynh
(74) *Attorney, Agent, or Firm* — AFMCLO/JAZ; John T. Addicks

(57) ABSTRACT

An automated aerial formation (AAF) system includes an imaging device mounted on an imaging first aircraft that receives reflected energy from an imaged second aircraft. A controller is communicatively coupled to the imaging device and a flight control system of one of the first and the second aircraft. The controller generates a three-dimensional (3D) point cloud based on the reflected energy and identifies a target 3D model in the 3D point cloud. The controller rotates and scales one of a pre-defined 3D model and the target 3D model to find a 3D point registration between the target 3D model and the pre-defined 3D model. The controller steers the flight control system of the one of first and the second aircraft into formation based on the distance and the relative pose determined from the rotating and scaling.

9 Claims, 10 Drawing Sheets

(51) Int. Cl.
| | |
|---|---|
| B64U 101/25 | (2023.01) |
| B64U 101/30 | (2023.01) |
| G01S 17/933 | (2020.01) |
| G06N 20/00 | (2019.01) |
| G06T 3/4084 | (2024.01) |
| G06T 7/285 | (2017.01) |

(52) U.S. Cl.
CPC ........... *G06T 3/4084* (2013.01); *G06T 7/285* (2017.01); *G08G 5/003* (2013.01); *B64U 2101/25* (2023.01); *B64U 2101/30* (2023.01); *G06T 2207/10028* (2013.01)

(58) Field of Classification Search
CPC ........ G06T 2207/10028; B64C 39/024; B64C 2201/127
See application file for complete search history.

(56) References Cited

U.S. PATENT DOCUMENTS

| | | | |
|---|---|---|---|
| 2019/0273909 A1* | 9/2019 | Ye | G06T 7/579 |
| 2021/0306614 A1* | 9/2021 | Wiman | G06T 7/593 |

OTHER PUBLICATIONS

Marco Mammarella, Giampiero Campa, Marcello R. Napolitano, Mario L. Fravolini, Yu Gu, Mario G. Perhinschi, "Machine Vision/GPS Integration Using EKF for the UAV Aerial Refueling Problem", Nov. 2008, IEEE Transactions on Systems, Man, and Cybernetics—Part C: Applications and Reviews. vol. 38. No. 6 (Year: 2008).*

Campa, Giampiero, Marcello R. Napolitano, and Mario L. Fravolini. "Simulation environment for machine vision based aerial refueling for UAVs." IEEE Transactions on Aerospace and Electronic Systems 45.1 (2009): 138-151.

Campa, Giampiero, et al. "Autonomous aerial refueling for UAVs using a combined GPS-machine vision guidance." AIAA Guidance, Navigation, and Control Conference and Exhibit. 2004.

Mammarella, Marco, et al. "Comparison of point matching algorithms for the UAV aerial refueling problem." Machine Vision and Applications 21.3 (2010): 241-251.

Fravolini, Mario Luca, Giampiero Campa, and Marcello R. Napolitano. "Evaluation of machine vision algorithms for autonomous aerial refueling for unmanned aerial vehicles." Journal of aerospace computing, information, and communication 4.9 (2007): 968-985.

Fravolini, M. L., et al. "Feature matching algorithms for machine vision based autonomous aerial refueling." 2006 14th Mediterranean Conference on Control and Automation. IEEE, 2006.

Mammarella, Marco, et al. "GPS/MV based aerial refueling for UAVs." AIAA Guidance, Navigation and Control Conference and Exhibit. 2008.

Fravolini, Mario L., et al. "Machine vision algorithms for autonomous aerial refueling for UAVs using the USAF refueling boom method." Innovations in Defence Support Systems—1. Springer, Berlin, Heidelberg, 2010. 95-138.

Mammarella, Marco, et al. "Machine vision/GPS integration using EKF for the UAV aerial refueling problem." IEEE Transactions on Systems, Man, and Cybernetics, Part C (Applications and Reviews) 38.6 (2008): 791-801.

Fravolini, Mario Luca, Giampiero Campa, and Marcello R. Napolitano. "Modelling and performance analysis of a machine vision-based semi-autonomous aerial refuelling." International Journal of Modelling, Identification and Control 3.4 (2008): 357-367.

Liu, Kevin, et al. "Precision relative navigation solution for autonomous operations in close proximity." 2008 IEEE/ION Position, Location and Navigation Symposium. IEEE, 2008.

Weaver, Adam D. "Using predictive rendering as a vision-aided technique for autonomous aerial refueling." (2009).

* cited by examiner

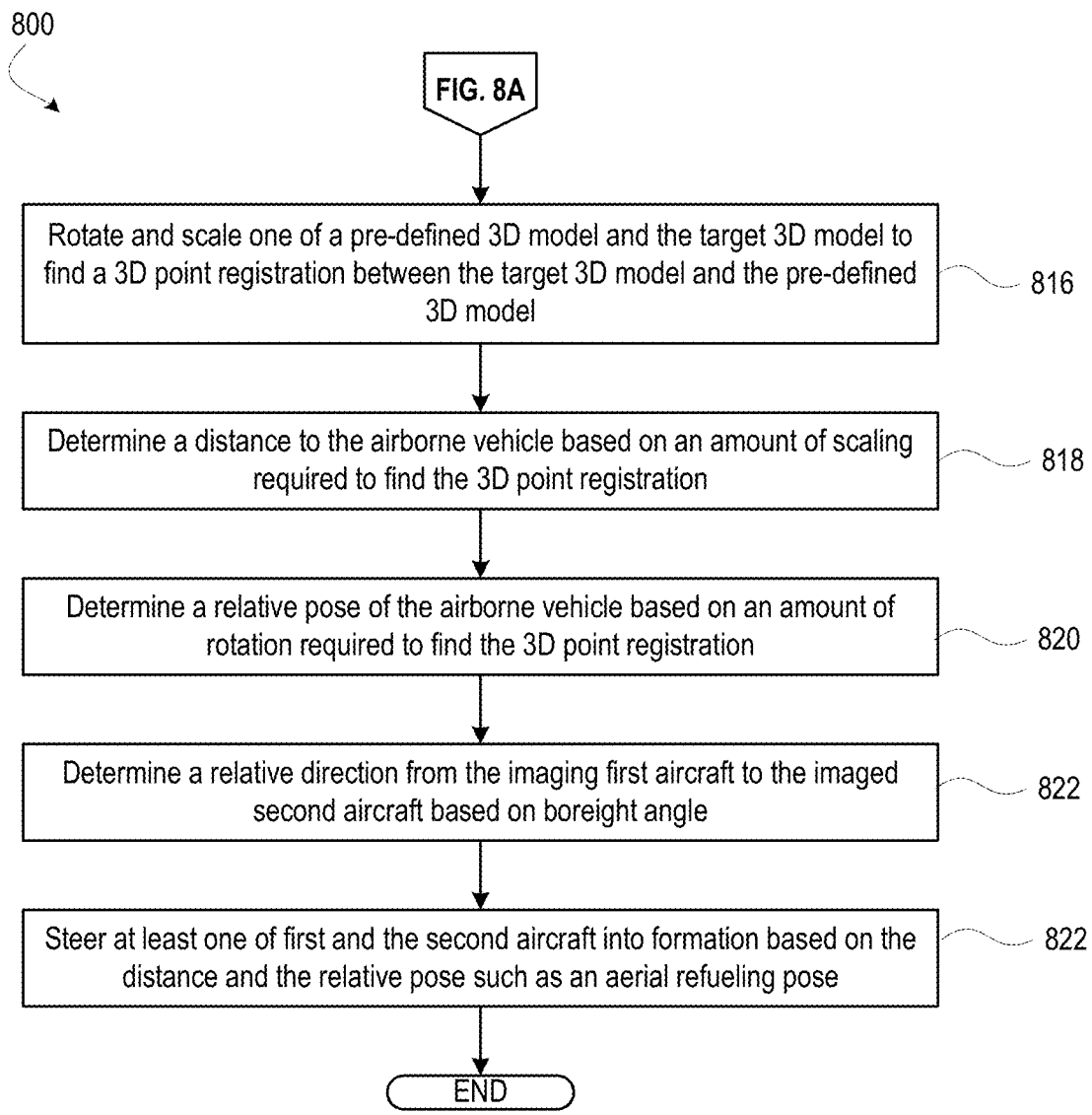

STEREO VISION RELATIVE NAVIGATION OF AIRBORNE VEHICLES

CROSS-REFERENCE TO RELATED APPLICATIONS

This application claims the benefit of priority under 35 U.S.C. § 119(e) to U.S. Provisional Application Serial No. 62/886,550 entitled "Stereo Vision Relative Navigation of Airborne Vehicles," filed 14Aug. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of image processing, and more particularly to testing apparatus and methods that use image processing to determine an orientation and vector to an aerial vehicle.

2. Description of the Related Art

For manned military aircraft, a significant limitation in loiter time or achievable flight distance is the amount of fuel that the aircraft can carry. Global reach of military aircraft often relies upon aerial refueling. Aerial refueling requires a proficient pilot to position the refueling aircraft relative to the tanker aircraft. Frequent proficiency training flights are required to maintain currency, part of which is gaining familiarity with recognizing an orientation and vector to the tanker aircraft.

Increasingly, unmanned aerial vehicles (UAVs) are being used instead of manned aircraft for many missions, creating a need for UAVs that can replace aircraft in longer missions in terms of time aloft and distance traveled. Unfortunately, aerial refueling is not feasible. Currently, Unmanned Aerial Vehicles are unsafe to refuel in-flight due to the communication latency between the UAV's ground operator and the UAV. Providing UAVs with an in-flight refueling capability would improve their functionality by extending their flight duration and increasing their flight payload.

One generally-known approach relies upon global positioning system (GPS) to provide a navigational reference that to an extent overcomes this latency problem. However, GPS is vulnerable to malicious interference that could deny this capability.

SUMMARY

The present innovation overcomes the foregoing problems and other shortcomings, drawbacks, and challenges of aerial refueling by a drone that is not dependent on locally jammable or spoofable geospatial satellites. While the present innovation will be described in connection with certain embodiments, it will be understood that the invention is not limited to these embodiments. To the contrary, this invention includes all alternatives, modifications, and equivalents as may be included within the spirit and scope of the present invention.

According to one aspect of the present innovation, a method enables automated aerial formation (AAF). In one or more embodiments, the method includes receiving, by an imaging first aircraft, a reflected energy from an imaged second aircraft. The method includes generating, by a controller, a three-dimensional (3D) point cloud based on the reflected energy. The method includes identifying a target 3D model in the 3D point cloud. The method includes rotating and scaling one of a pre-defined 3D model and the target 3D model to find a 3D point registration between the target 3D model and the pre-defined 3D model. The method includes determining a distance to the airborne vehicle based on an amount of scaling required to find the 3D point registration. The method includes determining a relative pose of the airborne vehicle based on an amount of rotation required to find the 3D point registration. The method includes steering at least one of first and the second aircraft into formation based on the distance and the relative pose.

According to one aspect of the present innovation, an AAF system includes an imaging device mounted on an imaging first aircraft that receives reflected energy from an imaged second aircraft. The AAF system includes a network interface that is communicatively coupled to a flight control system of one of the first and the second aircraft. A controller is communicatively coupled to the imaging device and the network interface. The controller generates a 3D point cloud based on the reflected energy. The controller identifies a target 3D model in the 3D point cloud. The controller rotates and scales one of a pre-defined 3D model and the target 3D model to find a 3D point registration between the target 3D model and the pre-defined 3D model. The controller determines a distance to the airborne vehicle based on an amount of scaling required to find the 3D point registration. The controller determines a relative pose of the airborne vehicle based on an amount of rotation required to find the 3D point registration. The controller steers the flight control system of the one of first and the second aircraft into formation based on the distance and the relative pose.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 8A-8B present a flow diagram of a method for automated aerial formation, according to one or more embodiments.

DETAILED DESCRIPTION

Figure 1A:
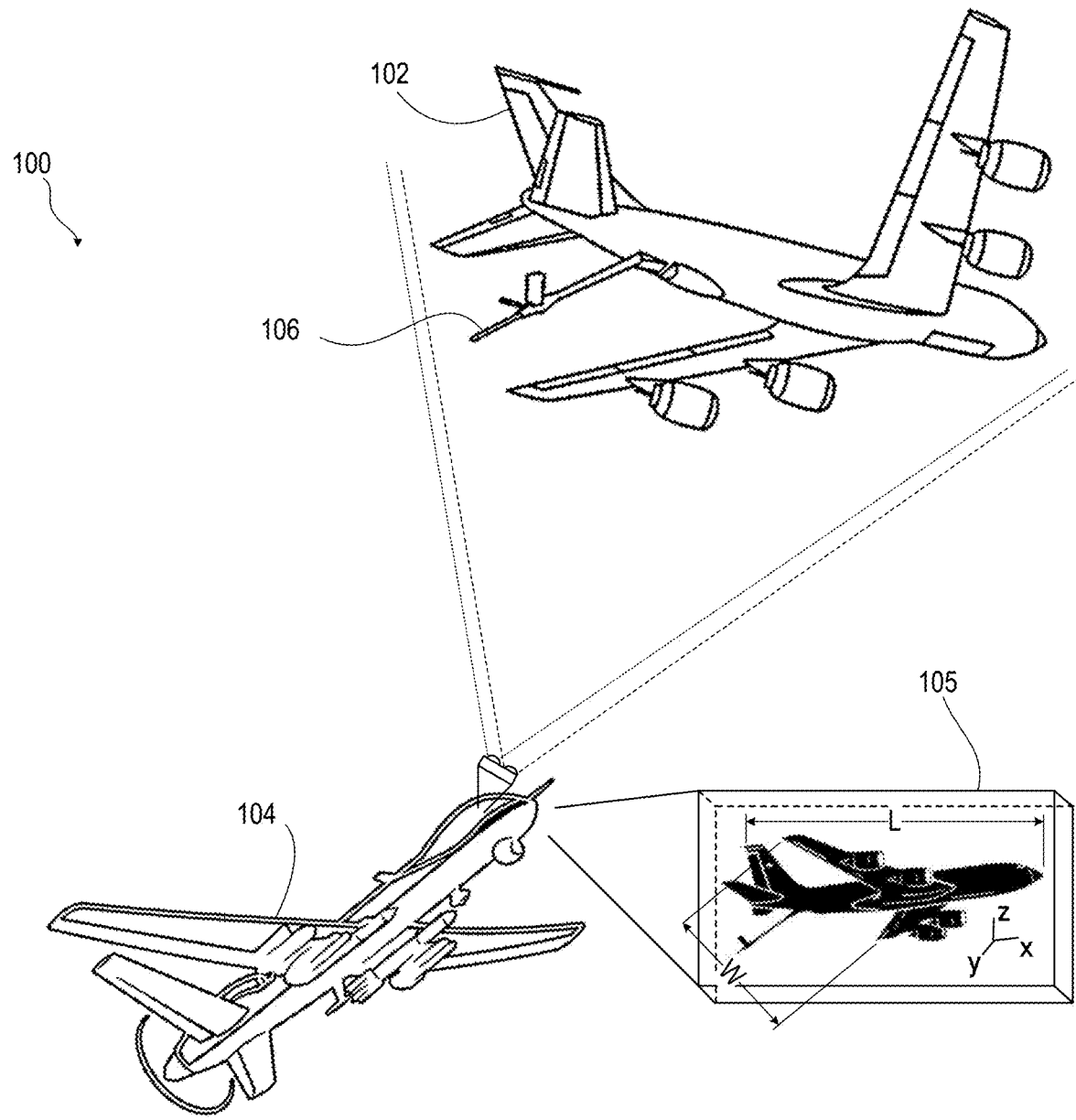
FIG. 1A depicts a three-dimensional (3D) scenario in which an automatic aerial formation (AAF) system images a refueling aircraft to guide a refueled aircraft into a refueling pose, according to one or more embodiments.

The present innovation provides a process by which stereo images collected from an imaging device are used to produce a sensed relative pose between two or more airborne vehicles. From this, any relative navigation task can be executed in an automated or human-assisted manner. One specific application of this process is for the automation of aerial refueling between a tanker aircraft and a receiver aircraft (either unmanned or manned). This process enables aerial refueling to be conducted using a vision-based computer process as the mechanism that drives the boom articulation and desired receiver aircraft position and orientation. The process can aid or replace the human who currently manually operates the boom. This process has direct application to aerial refueling using the USAF's Boom as well as the US Navy's Probe and Drouge aerial refueling technique. This technique operates in a fully GPS-denied environment as it only relies on local vision sensors. This specific process enables two aircraft to approach and hold a relative position and orientation using a stereo vision system installed on one of the two craft. Since this station keeping is possible, any application that relies on station keeping (such as aerial refueling) can then use this process to successfully dock and refuel in the three dimensional (3D) refueling envelope. Drones could use this same approach to fly in formation without relying on GPS, for example.

Challenges to Aerial Refueling: (i) Unmanned Aerial Vehicles (UAVs) are not capable of in-flight refueling via the boom method; (ii) Precise aircraft movements are required inside the 3D refueling envelope; and (iii) Communication latency between the UAV and its operator makes the precise movements dangerous.

In-flight refueling of UAVs is an important capability: (i) it would extend UAV flight duration; (ii) UAV payload could be increased; and (iii) use of UAVs has increased greatly over the past 20 years.

Automated Aerial Refueling (AAR) is an aerial refueling solution that leverages computer systems to complete the refueling process. Definition of Pose is position and orientation. Computers on the tanker compute the pose of the receiver according to one or more methods. Flight path is communicated between the tanker to the receiver.

The present innovation contemplates that reliance on GPS for computing position of the receiver does not address situations in which GPS becomes unavailable. The present innovation also contemplates that adding hardware to the fleet of UAVs is not desirable. Instead, the present innovation can use stereo cameras mounted on a refueling boom of a refueling aircraft. Ground tests validated this approach. A refueling scenario is replicated on the ground. Stereo vision is employed to compute receiver pose. Next generation tankers are expected to support stereo cameras near the boom. Electro-optical (EO) and infrared (IR) cameras were used. Pose estimates were calculated from the ground experiments and validated with GPS and inertial measurement unit (IMU) data.

As a general overview, the methodology includes: (i) Calibrate stereo vision system; (ii) Re-create refueling approach through ground experiment; (iii) Collect imagery of experiment using stereo vision system; (iv) Collect accurate GPS and IMU truth data; (v) Use stereo block matching to estimate pose during experiment; and (vi) Validate estimates with truth data.

Figure 1B:
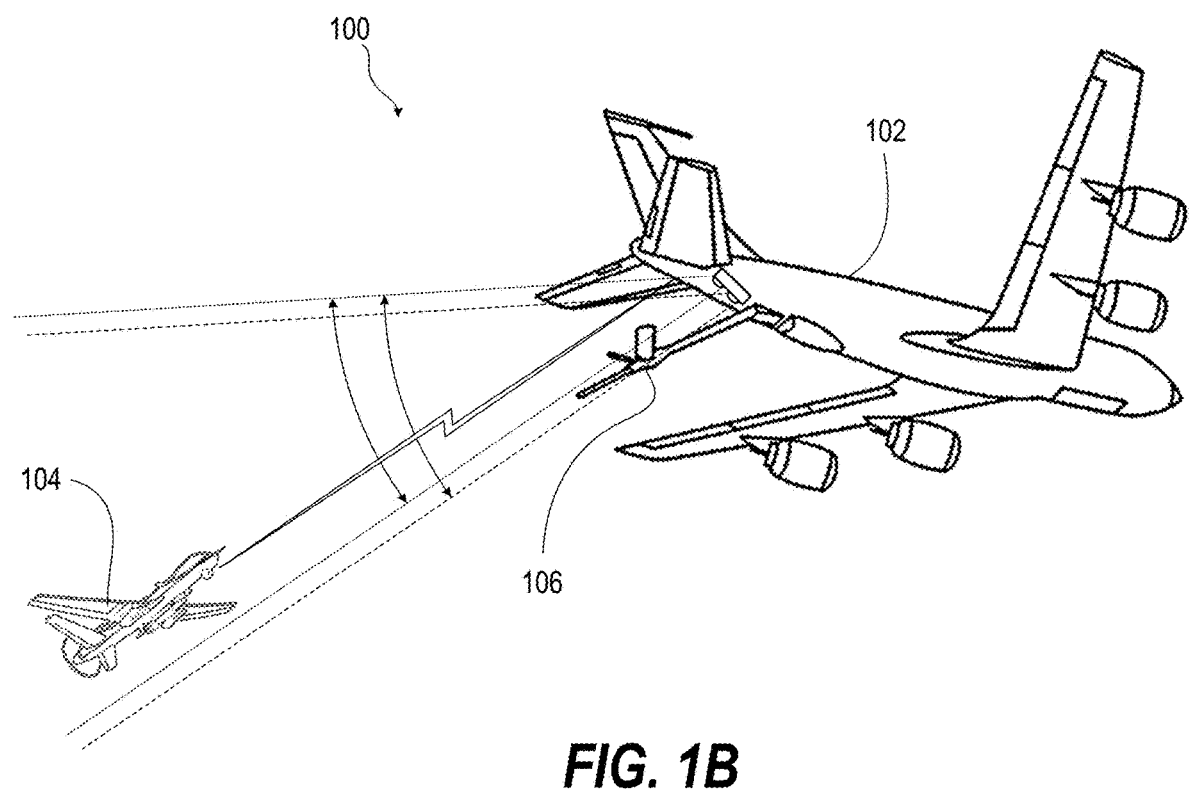
FIG. 1B depicts a 3D scenario in which the AAF system images the refueled aircraft to guide the refueled aircraft into a refueling pose, according to one or more embodiments.

FIG. 1A is a scenario in which an AAF system 100 guides one or both of an aerial refueling aircraft 102 and a refueled aircraft 104 into formation, specifically a refueling pose. An imaging device mounted on an imaging first aircraft that receives reflected energy from an imaged second aircraft. A 3D model 105 is referenced for determining an orientation and distance of the imaged second aircraft relative to the imaging first aircraft. In one or more embodiments, the imaging first aircraft is the refueled aircraft 104 and the imaged second aircraft is the aerial refueling aircraft 102. FIG. 1B depicts an alternative embodiment in which the imaging first aircraft is the refueling aircraft 102 and the imaged second aircraft is the refueled aircraft 104. In one or more embodiments, both aircraft 102, 104 support the guidance into formation. For example, the refueled aircraft 104 images the refueling aircraft 102 in order to align behind and below the refueling aircraft. Subsequently, the refueling aircraft 102 uses range and direction information to guide the refueled aircraft within reach of a refueling boom 106 without necessarily have a specific 3D model to access for the refueled aircraft 104.

Figure 2A:
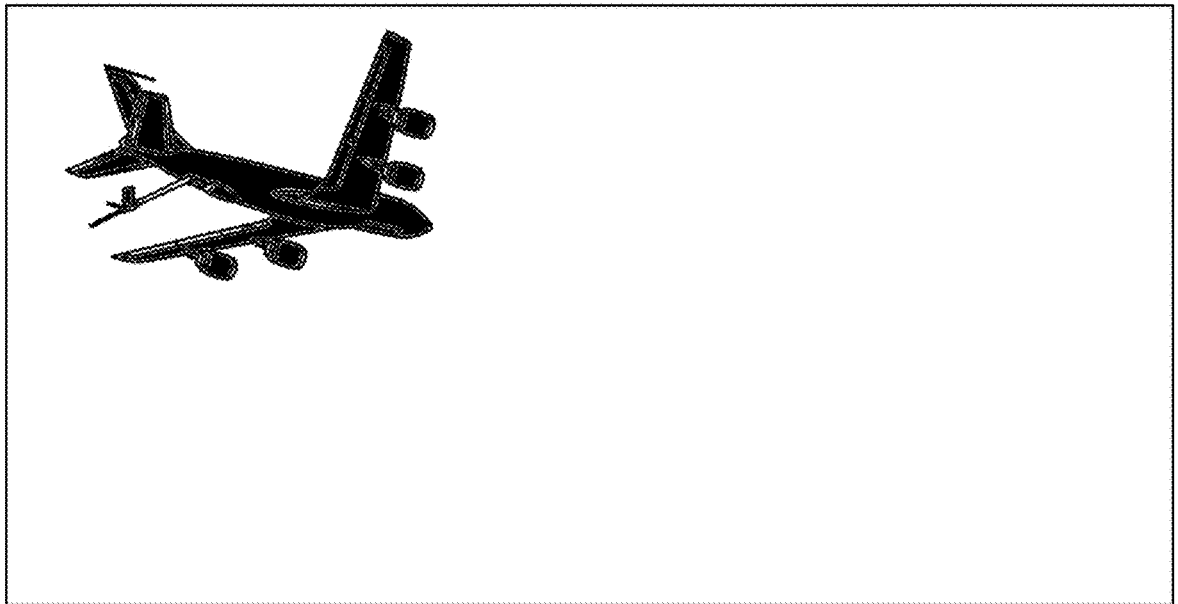
FIG. 2A depicts an image taken of the refueling aircraft that is not in an aerial refueling pose, according to one or more embodiments.
Figure 2B:
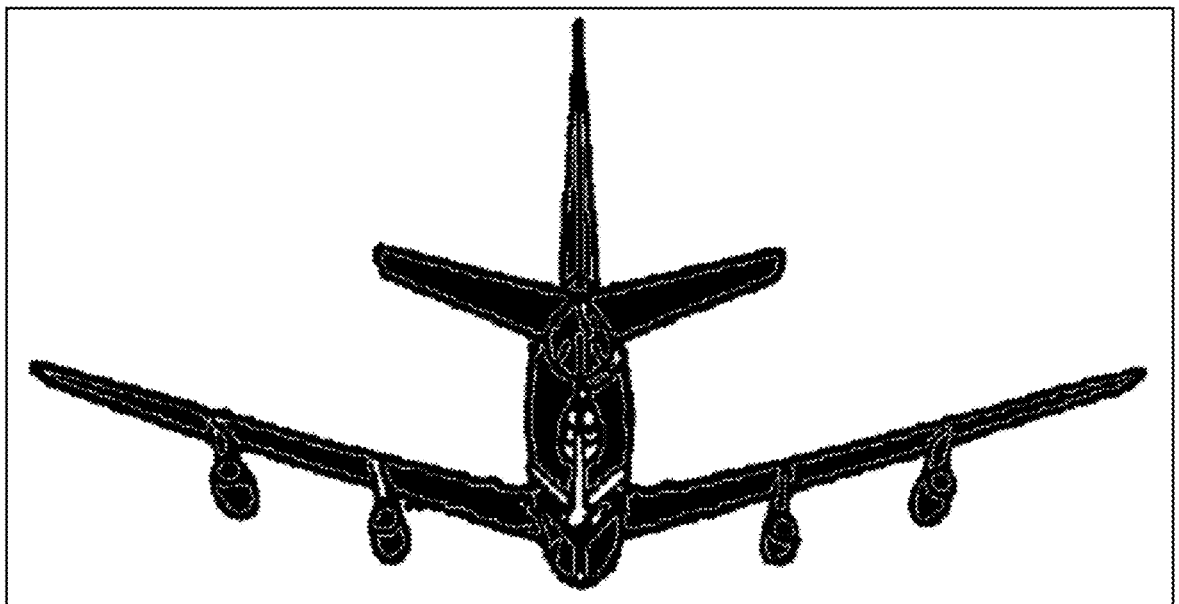
FIG. 2B depicts an image taken of the refueling aircraft that is in an aerial refueling pose, according to one or more embodiments.

FIG. 2A depicts an image 200 taken of the refueling aircraft 102 (FIG. 1A). The relative location of being above and to the right of a boresighted camera gives a relative direction. Scaling and rotating the 3D model to match the image 200 enables the refueled aircraft 104 (FIG. 1A) to determine a relative pose and distance to refueling aircraft 102 (FIG. 1A). FIG. 2B depicts an image 220 taken of the refueling aircraft 102 (FIG. 1A) when the refueled aircraft 104 (FIG. 1A) has achieved a refueling pose that is appropriate for engaging the refueling boom 106 (FIG. 1A).

Figure 3:
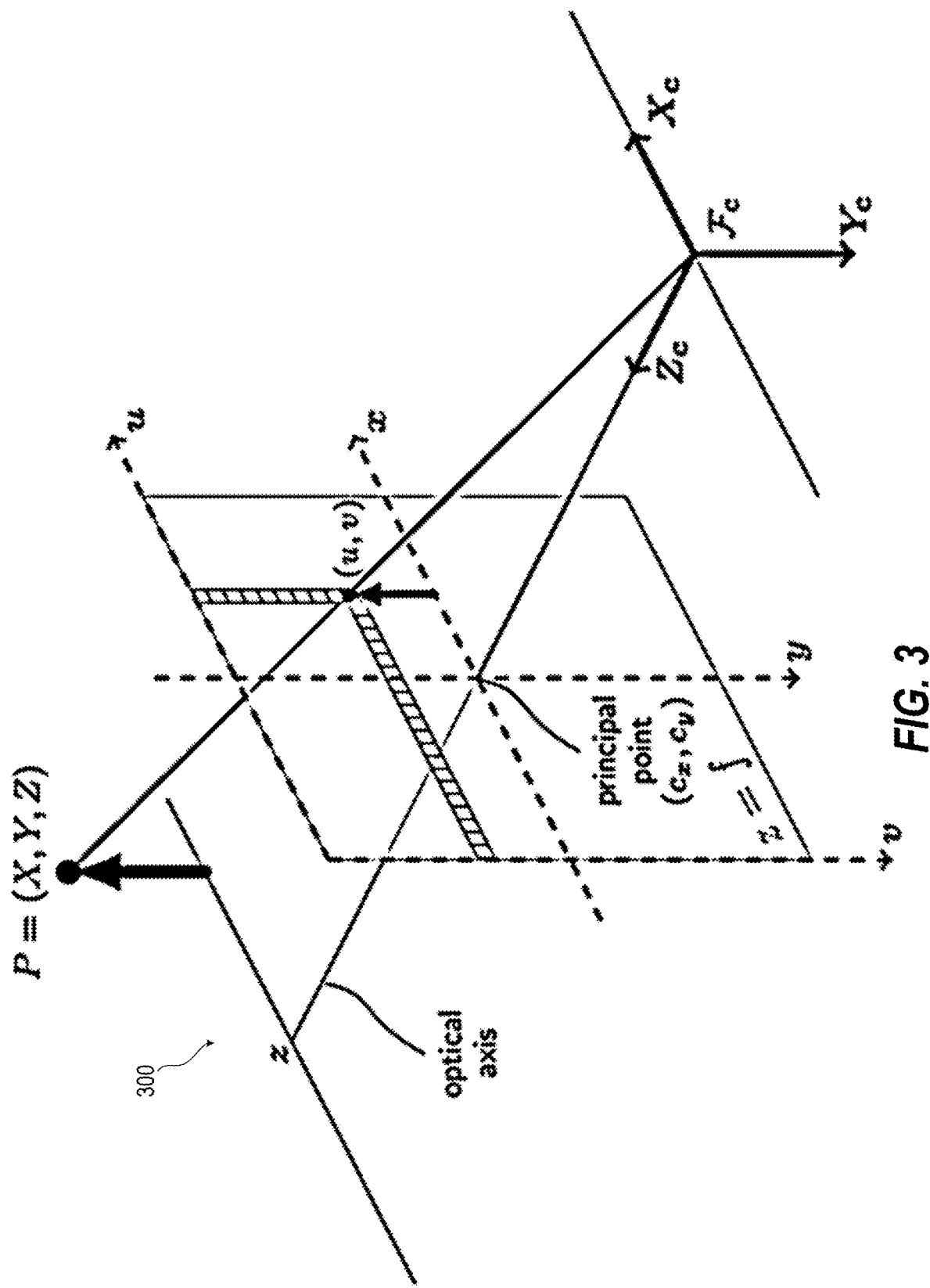
FIG. 3 is a diagram of computer vision that models the camera into a pinhole camera model, according to one or more embodiments.

FIG. 3 is a diagram 300 of computer vision that models the camera into a pinhole camera model. Modeling the stereo vision system often begins with the pinhole camera model. At a basic level, an image is simply a set of pixels from the viewpoint of a computer. Therefore, much work must be done to take sets of pixels (images) and turn them into a 3D environment. The pinhole camera model translates properties of a camera into geometric and mathematical properties. These geometric and mathematical properties can then be used to determine unknowns about the pixels in the image. The pinhole camera model is based on a tiny pinhole that defines how light passes through the aperture. The camera's focal point $F_c$ is centered in the pinhole camera model and defines the optical axis. The optical axis, $Z_c$, then passes through the center of a pinhole image plane at the principal point. Finally, refracted light from some point P in 3D space passes through a point (u, v) on the pinhole image plane. The point (u, v) on the image plane dictates the pixel in an image that shows point P. Ultimately, this geometric model helps extract a pixel's location in 3D space.

Figure 4:
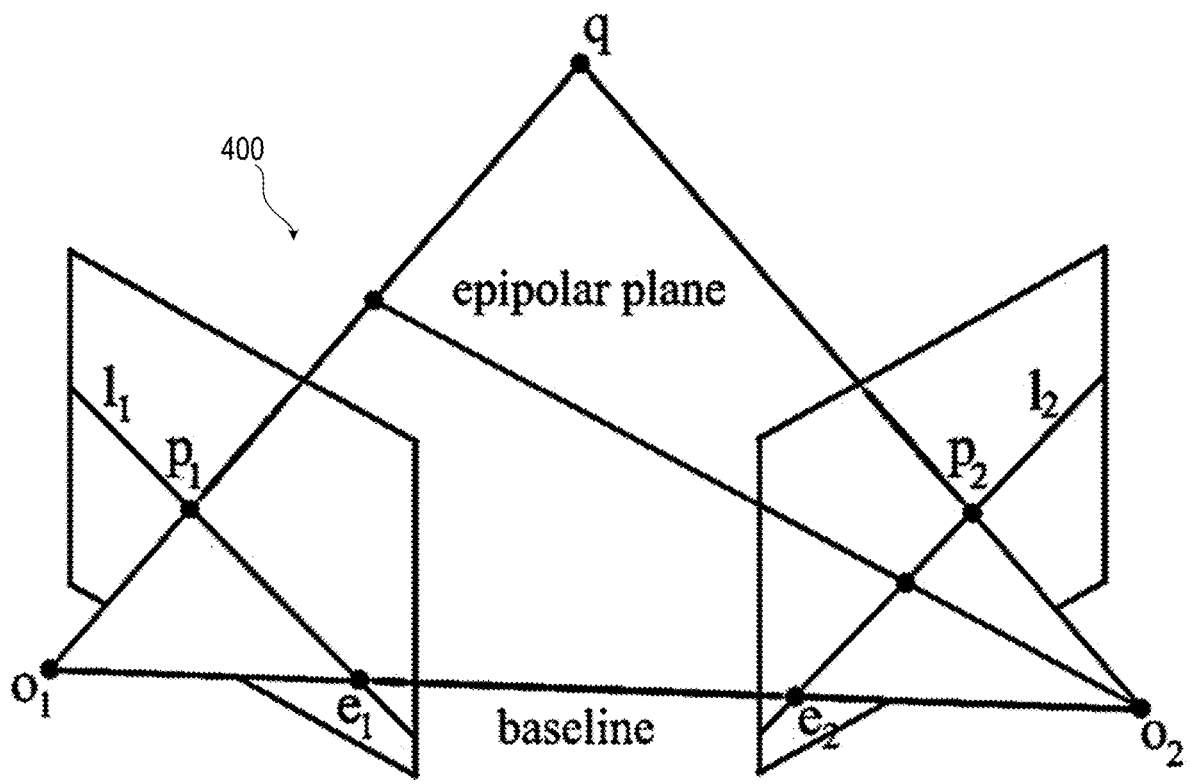
FIG. 4 is a diagram of epipolar geometry, according to one or more embodiments.

FIG. 4 is a diagram 400 of epipolar geometry. Since stereo vision makes use of multiple cameras, the geometric properties of each camera's pinhole model need to be modeled in the same system. This research utilizes a stereo vision system with two cameras, therefore, Epipolar Geometry can be used to relate the geometry of the first camera to the second camera. More specifically, Epipolar Geometry will relate the pixels of each camera that correspond to the same point in 3D space. Given a point q in 3D space, an "epipolar" plane can be drawn amongst the points q, $0_1$ (the focal point of the first camera), and $0_2$ (the focal point of the second camera) [10]. The plane must then intersect the first camera's image plane at some point $p_1$ and $e_i$ and as well as the second camera's image plane at some point $p_2$ and $e_2$. The goal then becomes determining what point $p_2$ corresponds to a given point $p_1$. To help determine $p_2$, the epipolar lines $l_1$ and $l_2$ are defined as the lines along which the epipolar plane intersects each camera's image plane. An epipolar baseline is then drawn as the line that connects the focal points of each camera and intersects the epipolar plane at points $e_1$ and $e_2$. Finally, point $p_2$ can be solved geometrically if the epipolar baseline, camera focal lengths, and depths of the points are known. The geometric relationship between $p_1$ and $p_2$ ultimately relates the position of q in 3D space to the cameras.

Camera calibration is a process that finds the intrinsic and extrinsic properties of stereo cameras. The intrinsic properties are the focal length and the principal point location specific to an individual camera. The extrinsic properties are the properties that correspond to both stereo cameras, such as the distance between each camera's focal point. More specifically, camera calibration determines the rotation and translation (epipolar baseline) from the first camera to the second camera, allowing the corresponding points in each camera's image plane to be found.

Figure 5A:
FIGS. 5A-5B are left and right IR images respectively taken during ground tests as part of calibration, according to one or more embodiments.
Figure 5B:

The method for camera calibration is given by Zhang. Zhang's method begins with taking images of patterns with known dimensions. An example of a good pattern is a checkboard, where the length of each square box on the checkerboard is constant and the length is a known value. For this process to work, multiple images should be taken from each camera with the checkerboard at different orientations. The corners of each square can then be visibly matched between the corresponding images from the two cameras at specific pixels. Having multiple images at multiple orientations reduces the error that the pixels chosen as the corners from the two camera's images are not the exact same point in 3D space. Zhang also describes how to mathematically find the rotation matrix and translation vector between the two cameras from the matched corners in the images. FIG. 5A is left IR image 500 and FIG. 5B is a corresponding right IR image 510 taken during research by the inventors as part of calibration.

Image rectification is the process of rotating corresponding images from the two cameras such that the epipolar lines become horizontal [8]. If comparing multiple points on the same images, then multiple epipolar lines will then appear horizontal and parallel to each other. Image rectification is useful because it simplifies the feature matching process by using the parallel lines to match features between the images. The center of the rectified images is also useful as a reference point for centering the 3D reconstruction between the cameras. At this stage, the camera calibration and rectified images can be used to reconstruct the pixels of each image into points in 3D space. The collective reconstructed pixels then forms a point cloud in 3D space.

From the standpoint of AAR, images of the receiver being refueled are captured and the reconstructed point cloud represents the receiver. The receiver point cloud is called the sensed model. However, the sensed model is simply a set of (x, y, z) position vectors at this point. The data from the sensed model needs to be turned into a pose estimate of the receiver. Registration is the process of matching 2D or 3D objects using features [8], or in this case using the point cloud's individual points. Registration helps determine a pose estimate by taking a reference model of the object and matching it to the sensed point cloud. The resulting pose of the reference model is the pose estimate of the object. In the case of AAR, the object is the receiver.

One mathematical process for completing registration is through an Iterative Closest Point (ICP) algorithm. An ICP algorithm can work by either matching the sensed point cloud to the reference point cloud or vice versa. Since the reference point cloud is matched to the sensed point cloud in this research, this is the perspective that will be used. First, each point in the reference point cloud is compared to each point in the sensed point cloud to find the closest point. After the closest point is found for each point in the reference point cloud, the rotation and translation between the points is found. The root mean square (RMS) distance between each of the nearest points is also calculated as the error. The rotation and translation that reduces the RMS error from the current RMS error is then applied to all of the points and the process is repeated. The registration is complete when the RMS error cannot be reduced any further. Although a solution may be found, the solution may be a local minima for the RMS error and not the global minima, which is the most accurate answer. Symmetrical objects are good examples of objects that can have local minima errors during registration. About the axis of symmetry, the object may be incorrectly oriented while having a RMS error local minima that prevents the error from being corrected.

Modeling the physical world is a difficult process and has error associated with it. For example, the lenses on the stereo cameras may distort the resulting images. Therefore, correction needs to take place to eliminate distortion error. The camera calibration process can also introduce error if the checkerboard corners are not perfectly aligned in the calibration. Therefore, the sensed model could have rotation and translation error associated with it. Ideally, error is recognized and reduced to 0. Nevertheless, it is important to compare the pose estimate for the sensed model with a truth source for the receiver's pose. Truth sources themselves may have known error, but the truth source's known error allows one to quantify the total error of the system.

Figure 6:
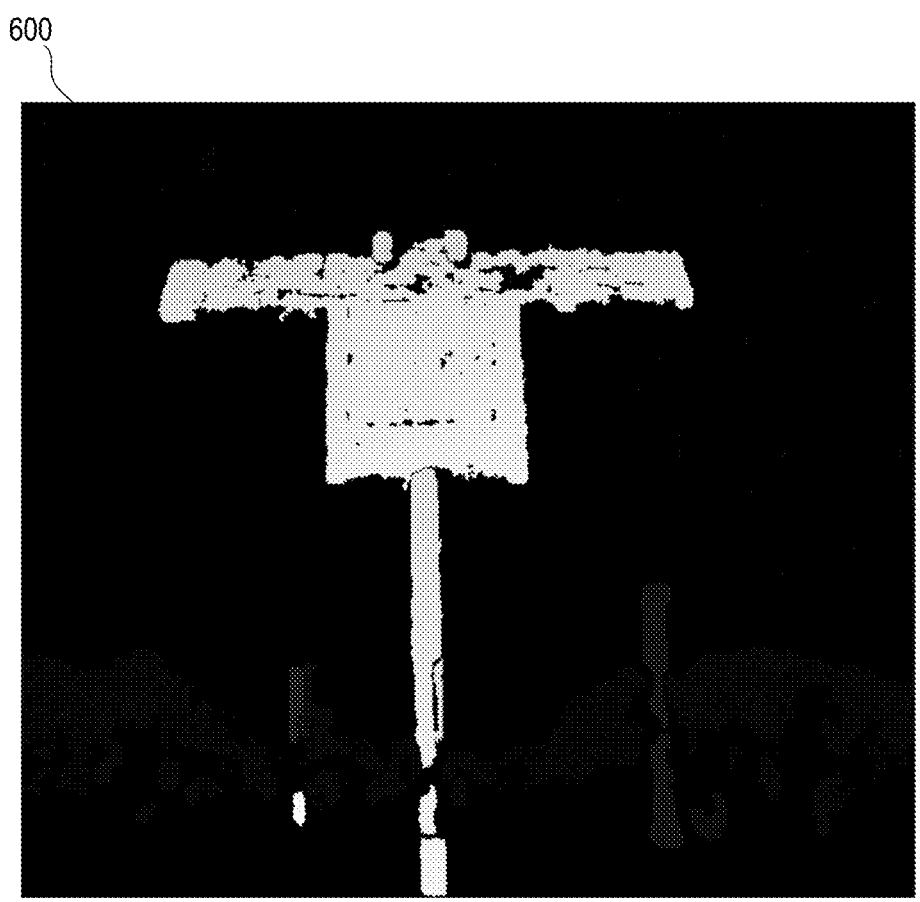
FIG. 6 depicts a disparity map created during ground simulation using the innovative methodology, according to one or more embodiments.

FIG. 6 depicts a disparity map 600 created during ground simulation using the innovative methodology. Lighter shades indicate a pixel that is closer to the camera and darker shades indicate a pixel that is farther from the camera.

Figure 7:
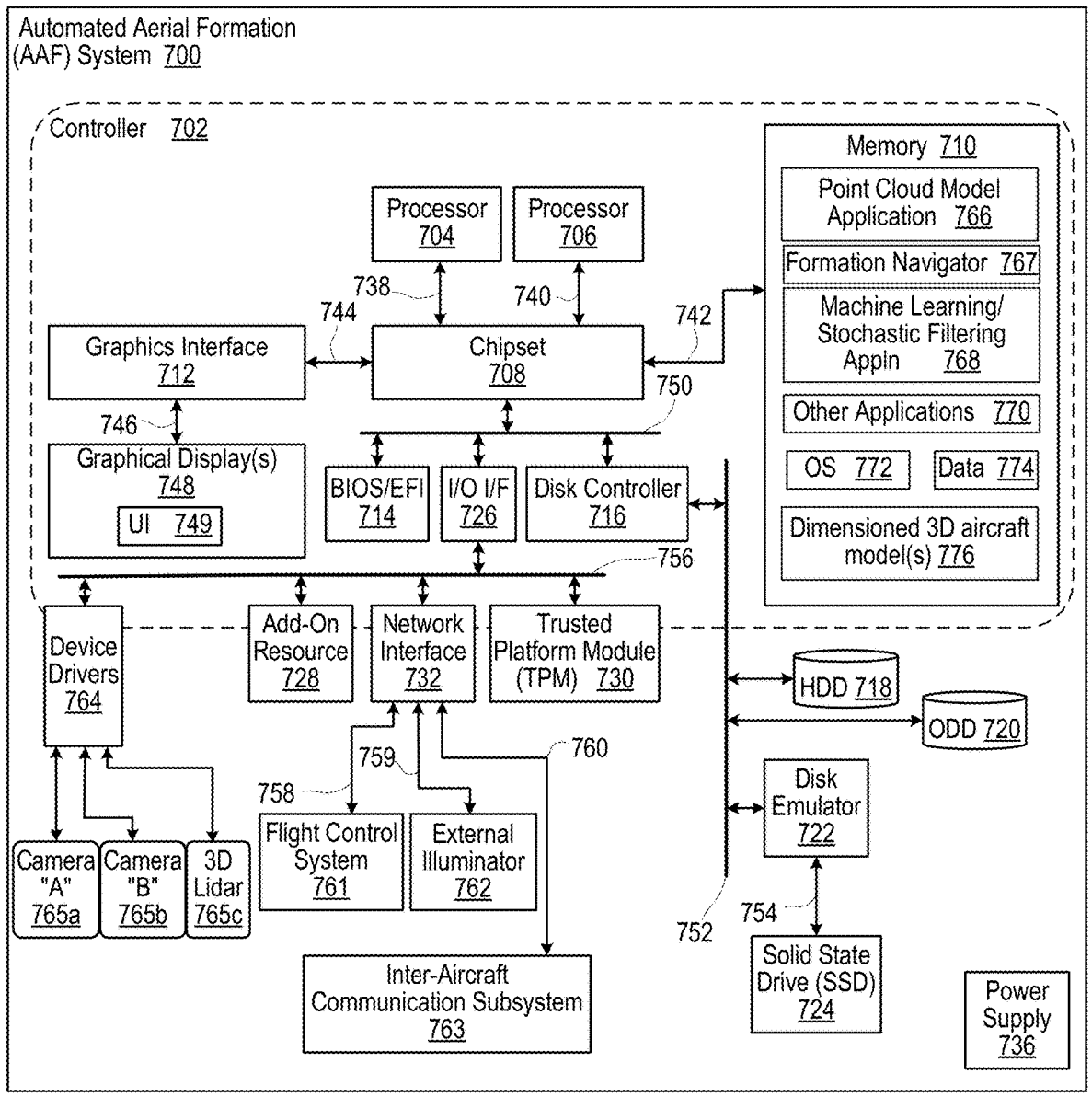
FIG. 7 depicts a diagrammatic illustration of an exemplary hardware and software environment of an AAF system customized to implement an AAF controller, according to one or more embodiments.

FIG. 7 is a diagrammatic illustration of an exemplary hardware and software environment of an automatic aerial formation (AAF) system 700 customized to implement an AAF controller 702 consistent with embodiments of the innovation. In one or more embodiments, the AAF system 700 is particularly suitable for use as an automated aerial refueling (AAR) system. AAF system 700 is in part a customized information handling system (IHS) 100 that performs at least a part of the methodologies and features as described herein. AAF system 700 can include processing resources for executing machine-executable code, such as a central processing unit (CPU), a programmable logic array (PLA), an embedded device such as a System-on-a-Chip (SoC), or other control logic hardware. AAF system 700 can also include one or more computer-readable medium for storing machine-executable code, such as software or data. Additional components of AAF system 700 can include one or more storage devices that can store machine-executable code, one or more communications ports for communicating with external devices, and various input and output (I/O) devices, such as a keyboard, a mouse, and a video display. In one or more embodiments, a human control station on board the refueling aircraft can monitor or perform manual control functions over the controller 702. AAF system 700 can also include one or more interconnects or buses operable to transmit information between the various hardware components. In one or more embodiments, the AAF system 700 is carried by the refueling aircraft. In one or more embodiments, the AAF system 700 is carried aboard the refueled aircraft. In one or more embodiments, the AAF system 700 is distributed between both the refueling aircraft and the refueled aircraft.

AAF system 700 includes processors 704 and 706, chipset 708, memory 710, graphics interface 712, a basic input and output system/extensible firmware interface (BIOS/EFI) module 714, disk controller 716, hard disk drive (HDD) 718, optical disk drive (ODD) 720, disk emulator 722 connected to an external solid state drive (SSD) 724, input/output (I/O) interface (I/F) 726, one or more add-on resources 728, a trusted platform module (TPM) 730, network interface 732, and power supply 736. Processors 704 and 706, chipset 708, memory 710, graphics interface 712, BIOS/EFI module 714, disk controller 716, HDD 718, ODD 720, disk emulator 722, SSD 724, I/O interface 726, add-on resources 728, TPM 730, and network interface 732 operate together to provide a host environment of AAF system 700 that operates to provide the data processing functionality of the information handling system. The host environment operates to execute machine-executable code, including platform BIOS/EFI code, device firmware, operating system code, applications, programs, and the like, to perform the data processing tasks associated with AAF system 700.

In a host environment, processor 704 is connected to chipset 708 via processor interface 738, and processor 706 is connected to the chipset 708 via processor interface 740. Memory 710 is connected to chipset 708 via a memory bus 742. Graphics interface 712 is connected to chipset 708 via a graphics bus 744, and provides a video display output 746 to graphical display(s) 748 that presents UI 749. In a particular embodiment, AAF system 700 includes separate memories that are dedicated to each of processors 704 and 706 via separate memory interfaces. An example of memory 710 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 714, disk controller 716, and I/O interface 726 are connected to chipset 708 via an I/O channel 750. An example of I/O channel 750 includes a Peripheral Component Interconnect (PCI) interface, a PCI-Extended (PCI-X) interface, a high speed PCI-Express (PCIe) interface, another industry standard or proprietary communication interface, or a combination thereof. Chipset 708 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 714 includes BIOS/EFI code operable to detect resources within AAF system 700, to provide drivers for the resources, initialize the resources, and access the resources. BIOS/EFI module 714 includes code that operates to detect resources within AAF system 700, to provide drivers for the resources, to initialize the resources, and to access the resources.

Disk controller 716 includes a disk interface 752 that connects the disk controller to HDD 718, to ODD 720, and to disk emulator 722. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 722 permits SSD 724 to be connected to AAF system 700 via an external interface 754. An example of external interface 754 includes a USB interface, an IEEE 1394 (Firewire) interface, a proprietary interface, or a combination thereof Alternatively, solid-state drive 724 can be disposed within AAF system 700.

I/O interface 726 includes a peripheral interface 756 that connects the I/O interface to add-on resource 728, to TPM 730, and to network interface 732. Peripheral interface 756 can be the same type of interface as I/O channel 742, or can be a different type of interface. As such, I/O interface 726 extends the capacity of I/O channel 742 when peripheral interface 756 and the I/O channel are of the same type, and the I/O interface translates information from a format suitable to the I/O channel to a format suitable to the peripheral channel 756 when they are of a different type. Add-on resource 728 can include a data storage system, an additional graphics interface, a network interface card (NIC), a sound/video processing card, another add-on resource, or a combination thereof. Add-on resource 728 can be on a main circuit board, on separate circuit board or add-in card disposed within AAF system 700, a device that is external to the information handling system, or a combination thereof.

Network interface 732 represents a network interface controller (NIC) disposed within AAF system 700, on a main circuit board of the information handling system, integrated onto another component such as chipset 708, in another suitable location, or a combination thereof. Network interface 732 includes network channels 758, 759 and 760 that provide interfaces to devices that are external to AAF system 700. In a particular embodiment, network channels 758 and 760 are of a different type than peripheral channel 756 and network interface 732 translates information from a format suitable to the peripheral channel to a format suitable to external devices. An example of network channels 758-760 includes InfiniBand channels, Fibre Channel channels, Gigabit Ethernet channels, proprietary channel architectures, or a combination thereof. Network channels 758-760 can be connected to external network resources such as a flight control system 761, external illuminator (visual or IR) 762, and an inter-aircraft communication subsystem 763. The network resource can include another information handling system, a data storage system, another network, a grid management system, another suitable resource, or a combination thereof. Imaging device drivers 764 can obtain visual or IR data from camera A 765*a*, camera B 765*b*, and/or a Lidar 765*c*.

Within memory 710, HDD 718, ODD 720, or SSD 724, one or more software and/or firmware modules and one or more sets of data can be stored that can be utilized during operations of AAF system 700. These one or more software and/or firmware modules can be loaded into memory 710 during operation of the AAF system 700. Specifically, in one embodiment, memory 710 can include therein a plurality of such modules, including AAF-specific applications, such as a point cloud model application 766, formation navigator 767, and machine learning/stochastic filtering application 768. Memory 710 can include one or more other applications 770, operating system (OS) 772, and data 774. One example of data is dimensioned 3D aircraft model(s) 776 These software and/or firmware modules have varying functionality as disclosed herein when their corresponding program code is executed by processors 704, 706.

Figure 8A:
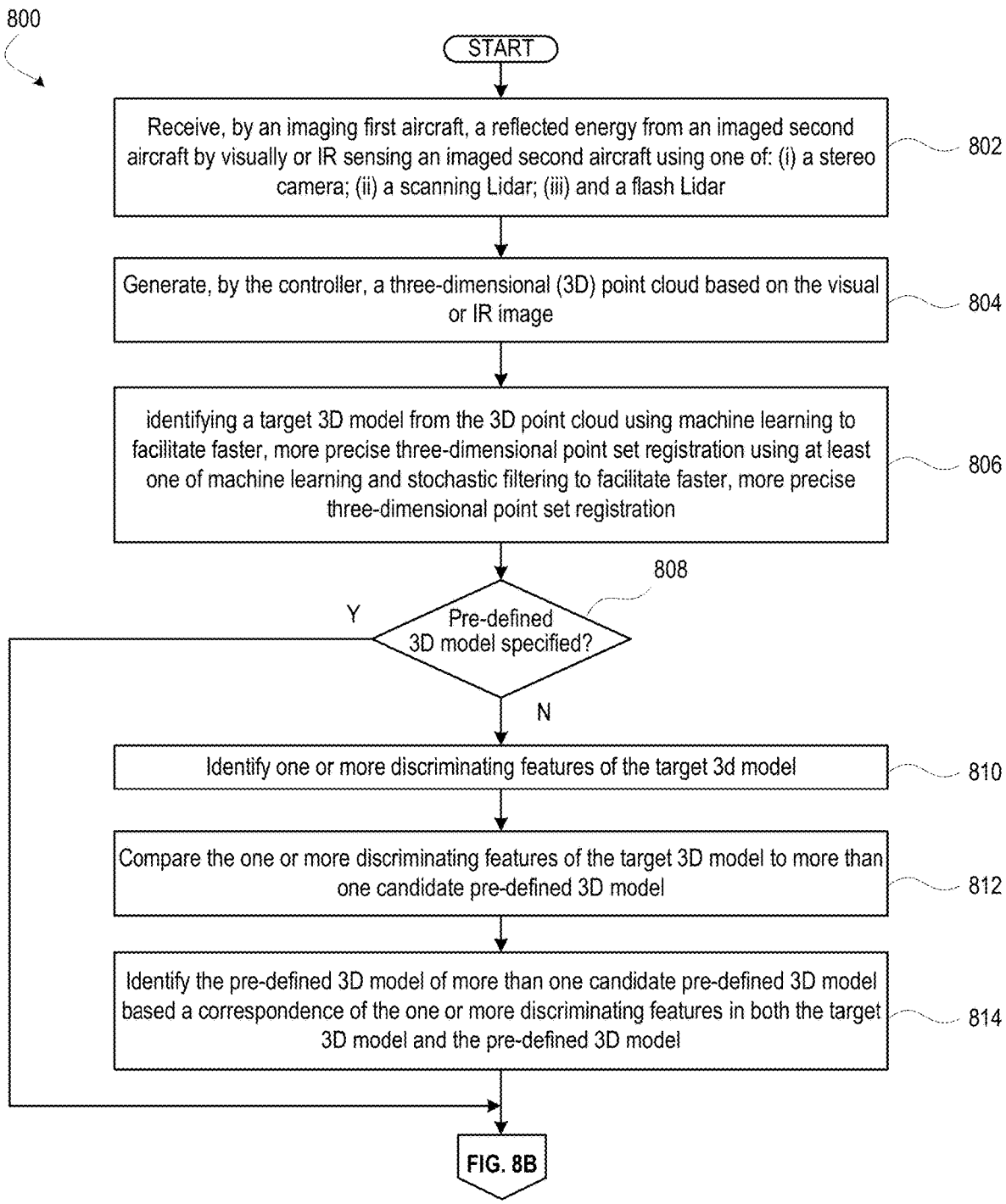

FIGS. 8A-8B present a flow diagram of a method 800 for automated aerial formation. With initial reference to FIG. 8A, method 800 includes receiving, by an imaging first aircraft, a reflected energy from an imaged second aircraft. In one or more embodiments, to reduce latency, a controller 702 (FIG. 7) performs or directs performance of method 800 and is carried on one or more of the refueling aircraft 102 (FIG. 1A) and the refueled aircraft 104 (FIG. 1A) that is an unmanned aerial vehicle. In one or more particular embodiments, method 800 includes visually or IR sensing an imaged second aircraft using one of: (i) a stereo camera; (ii) a scanning Lidar; (iii) and a flash Lidar (block 802). In one or more embodiments, the imaging first aircraft adds illuminating visual or IR light. Method 800 includes generating, by the controller, a three-dimensional (3D) point cloud based on the visual or IR image (block 804). Method 800 includes identifying a target 3D model from the 3D point cloud. In one or more particular embodiments, method 800 includes identifying the target 3D from the 3D point cloud using at least one of machine learning and stochastic filtering to facilitate faster, more precise three-dimensional point set registration (block 806).

In one or more embodiments, method 800 includes determining whether a pre-defined 3D model is specified, such as by user setting (decision block 808). In response to determining that the 3D model is not specified, method 800 includes identifying one or more discriminating features of the target 3d model (block 810). For example, a KC-10 can be identified by having tri-engines. A KC-135 could be identified as having four engines. A KC-46 could be identified by having two engines. A KC-130 could be identified by having four engines and a high wing. Method 800 includes comparing the one or more discriminating features of the target 3D model to more than one candidate pre-defined 3D model (block 812). Method 800 includes identifying the pre-defined 3D model of more than one candidate pre-defined 3D model based a correspondence of the one or more discriminating features in both the target 3D model and the pre-defined 3D model (block 814).

With reference to FIG. 8B, in response to determining that the 3D model is specified in decision block 808 or after identifying the pre-defined 3D model in block 814, method 800 includes rotating and scaling one of a pre-defined 3D model and the target 3D model to find a 3D point registration between the target 3D model and the pre-defined 3D model (block 816). Method 800 includes determining a distance to the airborne vehicle based on an amount of scaling required to find the 3D point registration (block 818). Method 800 includes determining a relative pose of the airborne vehicle based on an amount of rotation required to find the 3D point registration (block 820). Method 800 includes determining a relative direction from the imaging first aircraft to the imaged second aircraft based on boresight angle (block 822). Method 800 includes steering at least one of first and the second aircraft into formation based on the distance and the relative pose such as an aerial refueling pose (block 824). Then method 800 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An automated aerial formation (AAF) system comprising:
    an imaging device mounted on a first aircraft the imaging device comprising a first stereo camera and a second stereo camera configured to capture first and second stereo images, respectively, of a second aircraft;
    a network interface communicatively coupled to a flight control system of one of the first aircraft and the second aircraft, wherein one of the first or second aircraft is an unmanned aircraft; and
    a controller communicatively coupled to the imaging device and the network interface, and which:
        receives the first and second stereo images;
        generates a three-dimensional (3D) point cloud based on the first and second stereo images;
        identifies a target 3D model in the 3D point cloud;
        identifies one or more discriminating features of the target 3D model, wherein the discriminating features includes at least one of a number of aircraft engines of the second aircraft;
        compares the one or more discriminating features of the target 3D model to more than one candidate pre-defined 3D model; and
        identifies the pre-defined 3D model of more than one candidate pre-defined 3D model based a correspondence of the one or more discriminating features in both the target 3D model and the pre-defined 3D model;
        rotates and scales one of a pre-defined 3D model and the target 3D model to find a 3D point registration between the target 3D model and the pre-defined 3D model;
        determines a distance to the second aircraft based on an amount of scaling required to find the 3D point registration;
        determines a relative direction from the imaging first aircraft to the imaged second aircraft based on a boresight angle; and
        steers at least the unmanned aircraft into formation relative to the other aircraft based on the distance, the relative pose, and the relative direction.

2. The AAF system of claim 1, wherein the controller identifies the target 3D from the 3D point cloud using machine learning to facilitate faster, more precise three-dimensional point set registration.

3. The AAF system of claim 1, wherein the controller identifies the target 3D from the 3D point cloud using stochastic to facilitate faster, more precise three-dimensional point set registration.

4. The AAF system of claim 1, wherein the controller identifies the pre-defined 3D model of more than one pre-defined 3D model based on a user input.

5. A method for automated aerial formation (AAF), the method comprising:
    receiving a first stereo image from a first stereo camera and a second stereo image from a second stereo camera, the first and second stereo cameras comprising a stereo vision system on a first aircraft, the first and second stereo images being of a second aircraft, wherein one of the first or second aircraft is an unmanned aircraft;
    rectifying pixels of the first and second stereo images to construct a three-dimensional (3D) point cloud;
    identifying a target 3D model in the 3D point cloud;
    identifying one or more discriminating features of the target 3D model, wherein the one or more discriminating features includes at least a number of aircraft engines of the second aircraft;
    comparing the one or more discriminating features of the target 3D model to more than one candidate pre-defined 3D model; and
    identifying the pre-defined 3D model of more than one candidate pre-defined 3D model based a correspondence of the one or more discriminating features in both the target 3D model and the pre-defined 3D model;
    rotating and scaling one of a pre-defined 3D model and the target 3D model to find a 3D point registration between the target 3D model and the pre-defined 3D model;
    determining a distance to the second aircraft based on an amount of scaling required to find the 3D point registration;
    determining a relative pose of the second aircraft based on an amount of rotation required to find the 3D point registration;
    determining a relative direction from the first aircraft to the second aircraft based on a boresight angle; and
    steering the unmanned aircraft into formation relative to the other aircraft based on the distance, the relative pose, and the relative direction.

6. The method of claim 5, further comprising:
    identifying the target 3D from the 3D point cloud using machine learning to facilitate faster, more precise three-dimensional point set registration.

7. The method of claim 5, further comprising:
    identifying the target 3D from the 3D point cloud using stochastic filtering to facilitate faster, more precise three-dimensional point set registration.

8. The method of claim 5, wherein the controller is carried by at least one of the first and the second aircraft to reduce latency of image processing.

9. The method of claim 5 with the proviso that the method is operational without using a Global Positioning System (GPS).

* * * * *